United States Patent
McKenzie et al.

(10) Patent No.: US 12,533,612 B2
(45) Date of Patent: Jan. 27, 2026

(54) FILTER CARTRIDGE, AND METHOD OF RETROFITTING FILTER HOUSING

(71) Applicant: ENTEGRIS, INC., Billerica, MA (US)

(72) Inventors: Jeffrey J. McKenzie, Watertown, MN (US); James C. Linder, Victoria, MN (US); Barry Lee Gregerson, Deephaven, MN (US); Hayden Lincicome, Waltham, MA (US)

(73) Assignee: ENTEGRIS, INC., Billerica, MA (US)

( * ) Notice: Subject to any disclaimer, the term of this patent is extended or adjusted under 35 U.S.C. 154(b) by 199 days.

(21) Appl. No.: 17/833,024

(22) Filed: Jun. 6, 2022

(65) Prior Publication Data

US 2022/0387911 A1    Dec. 8, 2022

Related U.S. Application Data

(60) Provisional application No. 63/216,145, filed on Jun. 29, 2021, provisional application No. 63/197,187, filed on Jun. 4, 2021.

(51) Int. Cl.

| | |
|---|---|
| *B01D 29/96* | (2006.01) |
| *B01D 29/11* | (2006.01) |
| *B01D 29/66* | (2006.01) |
| *B01D 35/153* | (2006.01) |
| *B01D 35/30* | (2006.01) |

(52) U.S. Cl.
CPC ............ *B01D 29/96* (2013.01); *B01D 29/111* (2013.01); *B01D 29/114* (2013.01); *B01D 29/66* (2013.01); *B01D 35/153* (2013.01); *B01D 35/30* (2013.01); *B01D 2201/167* (2013.01); *B01D 2201/303* (2013.01); *B01D 2201/4084* (2013.01); *B01D 2201/4092* (2013.01)

(58) Field of Classification Search
CPC ..... B01D 29/96; B01D 29/111; B01D 29/114; B01D 29/66; B01D 35/153; B01D 35/30; B01D 2201/167; B01D 2201/303; B01D 2201/4084; B01D 2201/4092; B01D 2201/302; B01D 29/35; B01D 2201/305
USPC ........ 210/234–238, 244–245, 442, 444, 455, 210/470
See application file for complete search history.

(56) References Cited

U.S. PATENT DOCUMENTS

| | | | |
|---|---|---|---|
| 3,982,520 A * | 9/1976 | Wheeler | B01D 35/306 184/6.24 |
| 5,362,390 A | 11/1994 | Widenhoefer et al. | |

(Continued)

FOREIGN PATENT DOCUMENTS

| | | |
|---|---|---|
| CN | 103566638 A | 2/2014 |
| CN | 107110389 A | 8/2017 |

(Continued)

*Primary Examiner* — Madeline Gonzalez

(57) ABSTRACT

A removable filter cartridge includes a filter housing containing a filter and a sealing valve coupled to an open end of the filter housing. The sealing valve configured to removably couple the removable filter cartridge to a filter head. An open position allows fluid to flow into and out of the internal volume of the filter housing. A closed position seals the filter housing. A method for retrofitting a filter housing includes removing the filter housing from a filter head, coupling a sealing valve to the removable filter to form a removable filter cartridge, and coupling the removable filter cartridge to the filter head.

15 Claims, 8 Drawing Sheets

(56) References Cited

U.S. PATENT DOCUMENTS

| | | | | |
|---|---|---|---|---|
| 2008/0210611 | A1* | 9/2008 | Tabb | ........................ B01J 20/08 |
| | | | | 210/153 |
| 2009/0249754 | A1 | 10/2009 | Hendrik et al. | |
| 2014/0124459 | A1* | 5/2014 | Li | ........................ B01D 35/147 |
| | | | | 210/450 |
| 2015/0337695 | A1 | 11/2015 | Ardes | |

FOREIGN PATENT DOCUMENTS

| | | |
|---|---|---|
| CN | 211987318 U | 11/2020 |
| CN | 218421349 U | 2/2023 |
| JP | S5970709 U | 5/1984 |
| JP | S61121913 U | 8/1986 |
| JP | H0261410 U | 5/1990 |
| JP | H07100309 A | 4/1995 |
| JP | 2018084180 A | 5/2018 |
| KR | 20090067032 A | 6/2009 |
| KR | 20110137066 A | 12/2011 |
| KR | 20130130941 A | 12/2013 |
| TW | 300168 B | 3/1997 |
| TW | 490317 B | 6/2002 |

\* cited by examiner

FILTER CARTRIDGE, AND METHOD OF RETROFITTING FILTER HOUSING

CROSS-REFERENCE TO RELATED APPLICATIONS

This application claims the benefit under 35 USC 119 of U.S. Provisional Patent Application No. 63/197,187, filed Jun. 4, 2021, the disclosure of which is hereby incorporated herein by reference in its entirety.

FIELD

This disclosure generally relates a filter assembly. More particularly, this disclosure relates to a removable filter cartridge in a filter assembly.

BACKGROUND

Filters can be employed in semiconductor manufacturing to remove contaminants from a fluid. A filter head can direct a fluid (e.g., liquid, water, or the like) through a removable filter. The filter can be configured to remove containment such as, for example, solids as the liquid passes through the filter. In particular, a filter can be used to remove solid containments from a liquid as the liquid passes through the filter. A filter becomes saturated with trapped containments (e.g., solids) over time and is then replaced. Conventionally, the housing of the filter is drained and then removed and replaced with a new filter.

SUMMARY

In an embodiment, a removable filter cartridge includes a filter housing and a sealing valve that is coupled to an open end of the filter housing. The filter housing has an internal volume that contains a filter. The sealing valve includes first threads for removably coupling the removable filter cartridge to a filter head. The sealing valve has an open position and a closed position. The open position allows fluid to flow into and out of the internal volume of the filter housing. The closed position that seals the internal volume of the filter housing. The sealing valve in the closed position is configured to seal the internal volume while removably coupled to the filter head and maintain the seal while the removable filter cartridge remains uncoupled.

In an embodiment, a sealing valve for a removable filter cartridge includes first threads and second threads. The first threads are for removably coupling the sealing valve to a filter head. The second threads are for coupling the sealing valve to a filter housing to form the removable filter cartridge. The filter housing has an internal volume that contains a filter. The sealing valve has an open position and a closed position. The open position is configured to direct fluid from the filter head into the filter housing and then from the filter housing back to the filter head. The closed position is configured to seal the internal volume of the filter housing when the removable filter cartridge is removably coupled to the filter head and to maintain the seal while the removable filter cartridge remains uncoupled.

In an embodiment, a method is for retrofitting a filter housing that has an internal volume containing a filter. The method includes removing the filter housing from a filter head including unscrewing the filter housing from the filter head. The method also includes coupling a sealing valve to the removable filter to form a removable filter cartridge that includes screwing together the filter housing and the sealing valve. The method also includes coupling the removable filter cartridge to the filter head including screwing the removable filter cartridge onto the filter head using first threads of the sealing valve. The sealing valve has an open position and a closed position. The open position allows fluid from the filter head to flow into and out of the filter housing through the sealing valve. The closed position seals the internal volume of the filter housing. The sealing valve in the closed position is configured to seal the internal volume while removably coupled to the filter head and maintain the seal while the removable filter cartridge remains uncoupled.

DRAWINGS

Like numbers represent like features.

DETAILED DESCRIPTION

This disclosure relates to filters, and in particular to removable filter cartridges used in a filter assembly.

After being used for a time, a filter becomes saturated with trapped containments (e.g., solids) over time and has a reduced filtering capacity. For example, many filters are configured to be replaced after being used for a predetermined amount of time, or after filter a predetermined amount of fluid. Conventionally, the housing of the filter is drained and then removed and replaced with a new filter. However, this draining of the filter's housing can take additional time and require downtime for a processes associated with the fluid being filtered. For example, in semiconductor manufacturing, a manufacturing step/process may be delayed shortly while the filter housing is drained and then replaced. This can cause an increase in the overall time for a manufacturing a semiconductor. Embodiments disclosed herein are configured to address this issue by advantageously allowing removable of a filter cartridge without having to drain the filter housing.

Figure 1:
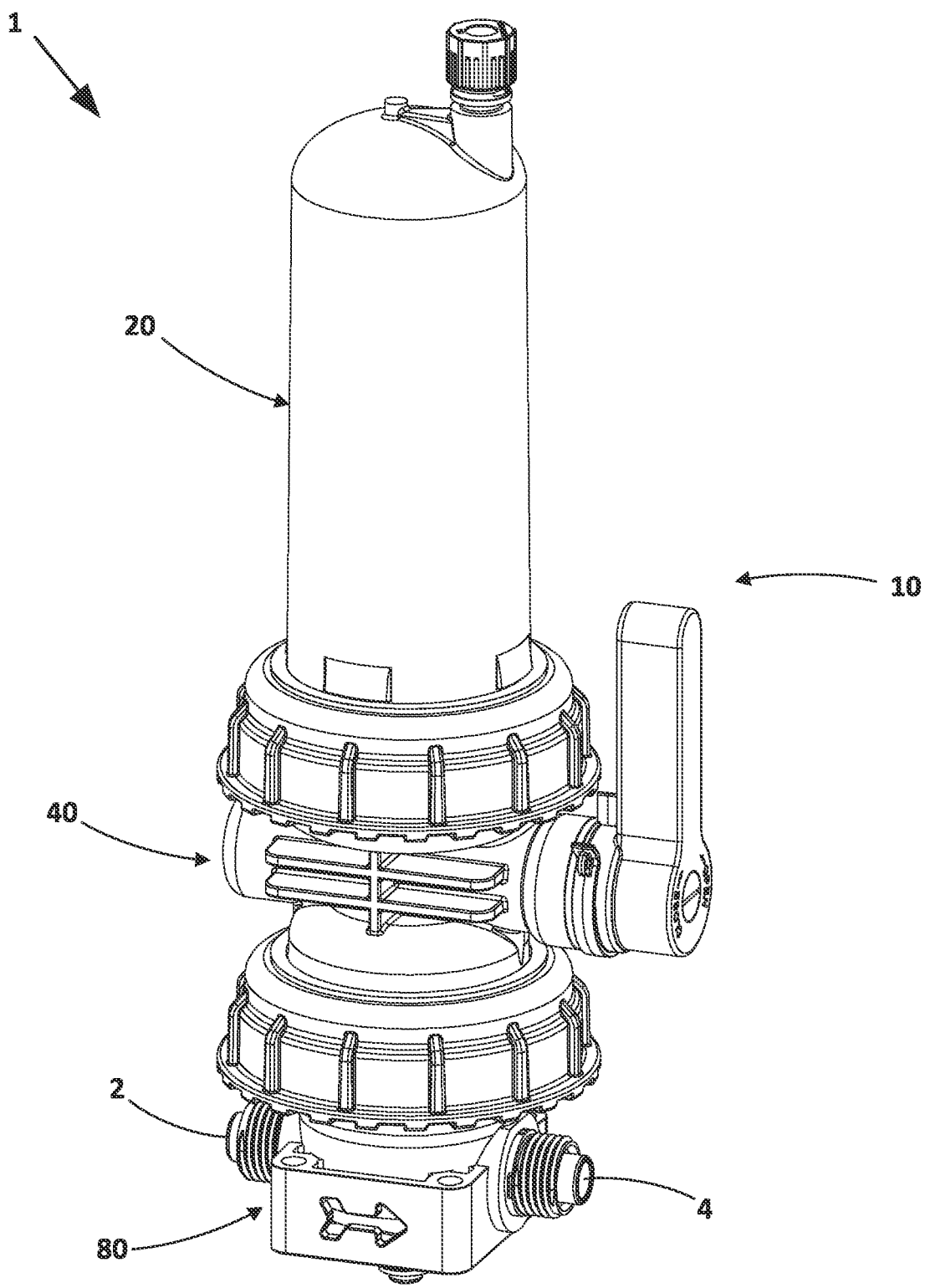
FIG. 1 is a front perspective view of an embodiment of a filter assembly.
Figure 2:
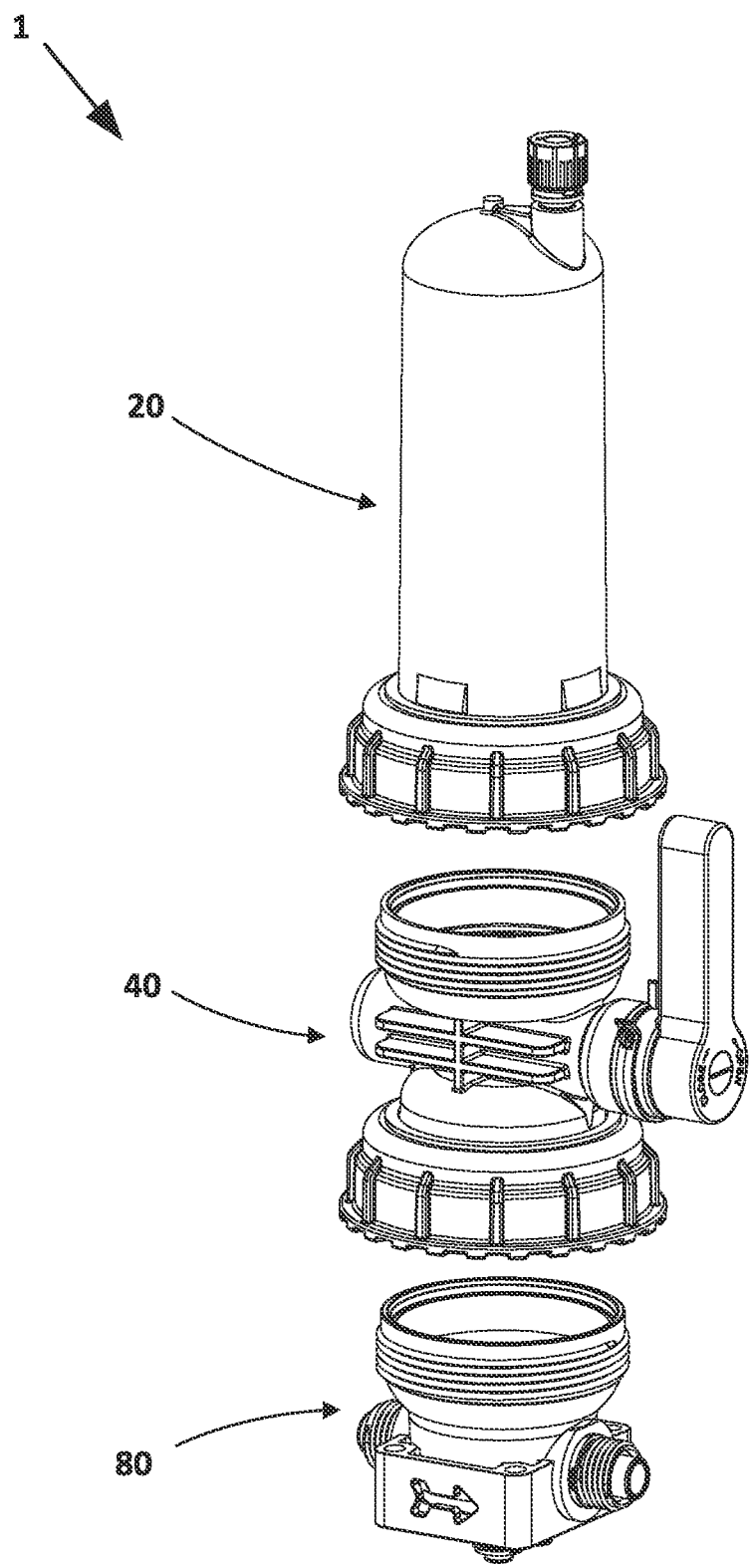
FIG. 2 is an exploded view of the filter assembly of FIG. 1, according to an embodiment.

FIGS. 1 and 2 show an embodiment of a filter assembly 1. FIG. 1 is a front perspective view of the filter assembly 1. The filter assembly 1 includes a fluid inlet 2 and a fluid outlet 4. A fluid to be filtered is supplied to the fluid inlet 2, is filtered by the filter assembly 1, and then the filtered fluid is directed out from the fluid outlet 4 of the filter assembly 1. The filter assembly 1 removes solids from the fluid as the fluid passes through. In an embodiment, the fluid is liquid or mostly liquid. For example, the liquid may be water (e.g., deionized water), HCl, HNO$_3$, isopropyl alcohol, or the like. In an embodiment, the fluid is water. The filter assembly 1 includes a removable filter cartridge 10 that is coupled to a filter head 80. The removed solids remain within the filter cartridge 10. The filter head 80 includes the fluid inlet 2 and the fluid outlet 4 of the filter assembly 1.

The removable filter cartridge 10 is configured to be removed from the filter head 80. For example, the removable filter cartridge 10 is removed when due for replacement. The removable filter cartridge 10 may be due for replacement after performing a predetermined amount of filtering. For example, after the removable filter cartridge 10 has filtered predetermined amount of fluid, has filtered a predetermined amount of material from the fluid, has been in use for a predetermined amount of time, has reached a particular saturation of filtered material, etc.

The removable filter cartridge 10 includes a filter housing 20 and a sealing valve 40. The sealing valve 40 is coupled to the filter housing 20 to form the removable filter cartridge 10. The sealing valve 40 removably couples the removable filter cartridge 10 to the filter head 80. As shown in FIG. 1, the filter housing 20 is removably coupled to the filter head 80 by the sealing valve 40.

FIG. 2 is an exploded view of the removable filter cartridge 10. FIG. 2 shows the filter housing 20, sealing valve 40, and filter head 80 when uncoupled from each other. In the illustrated embodiment, the sealing valve 40 is uncoupled from the filter head 80 by being unscrewed from the filter head 80, and the filter housing 20 is uncoupled from the sealing valve 40 by being unscrewed from the filter head 80.

Figure 3:
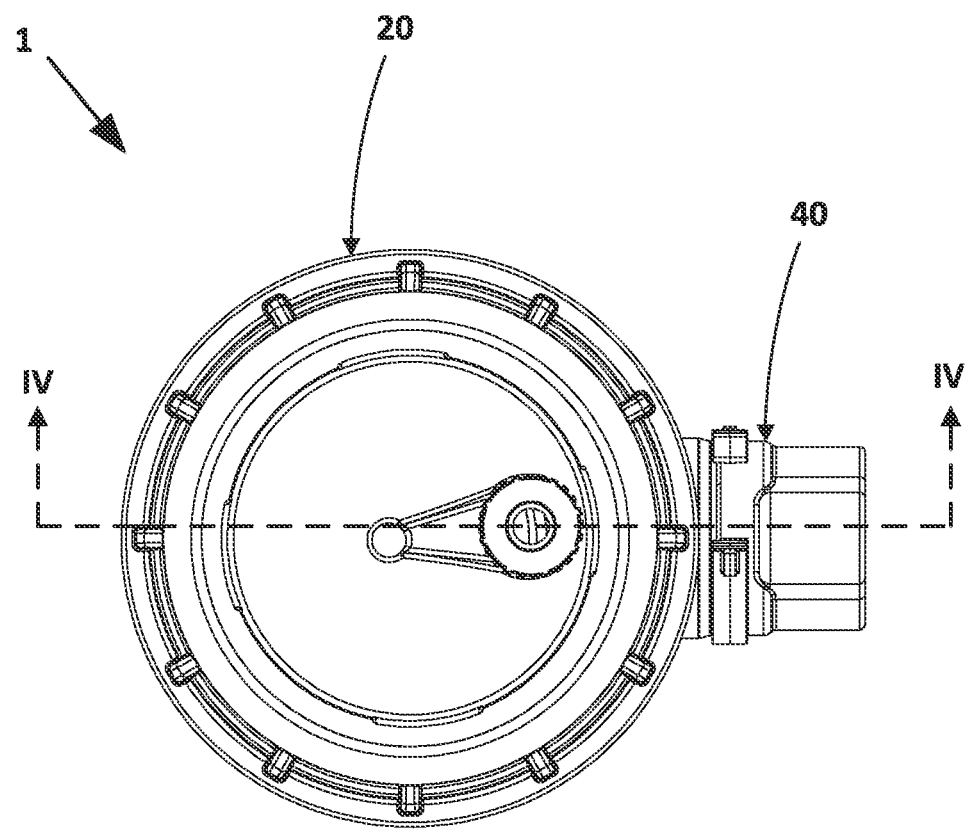
FIG. 3 is a top view of the filter assembly of FIG. 1, according to an embodiment.
Figure 4:
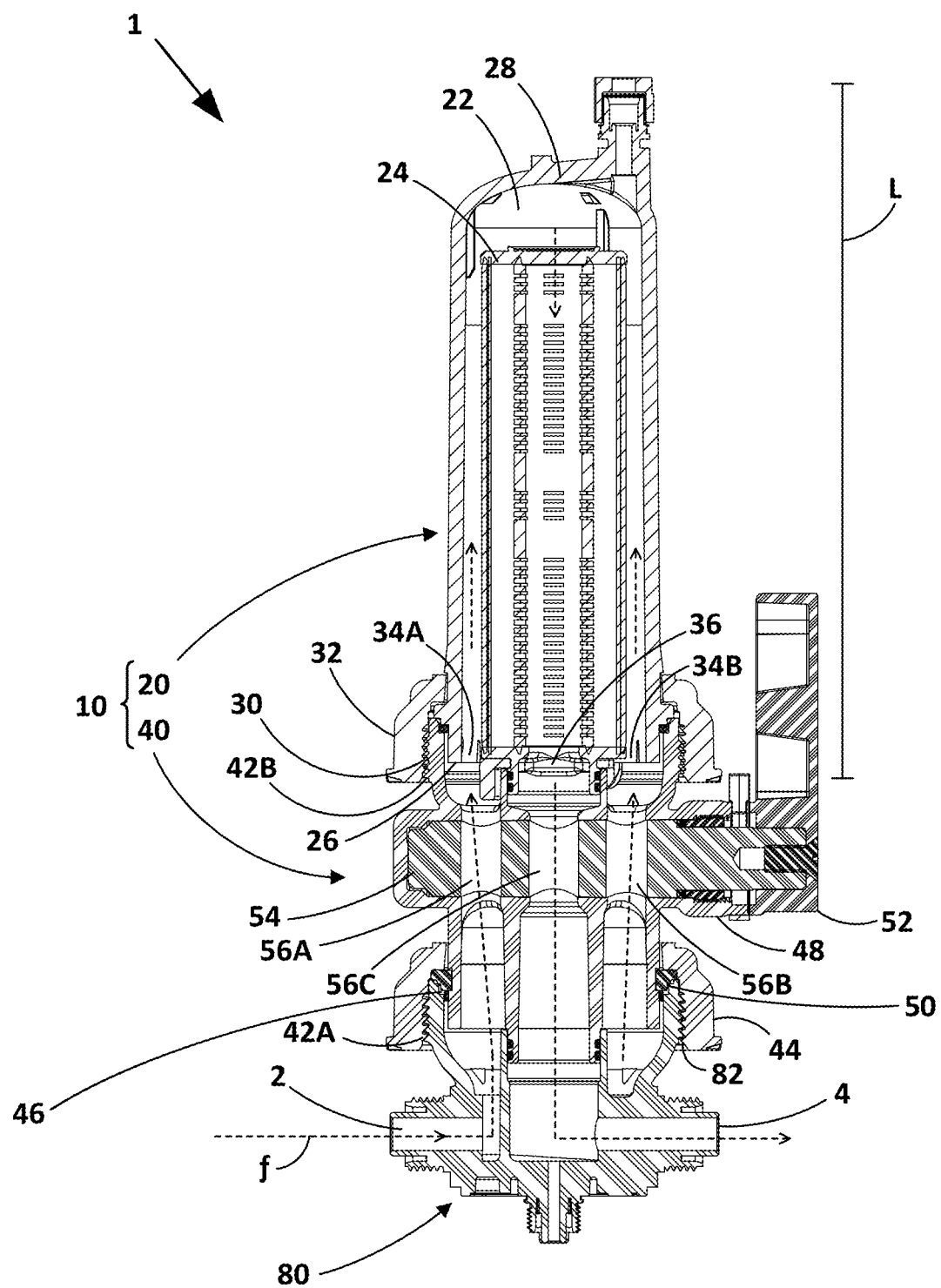
FIG. 4 is a cross sectional view of the filter assembly along the line IV-IV in FIG. 3 in an open position, according to an embodiment.

FIG. 3 is a top view of the filter assembly 1. FIG. 4 is a vertical cross-sectional view of the filter assembly 1 along the line IV-IV in FIG. 3. The sealing valve 40 has an open position and a closed position. FIG. 4 shows the sealing valve 40 in the open position that allows the fluid f to pass through the filter assembly 1. Dashed lines are provided in FIG. 4 to illustrate the flow of the fluid f through the filter assembly 1. In the open position, fluid f from the filter head 80 is allowed to pass through the sealing valve 40 to the filter housing 20, pass through the filter housing 20, and then pass from the filter housing 40 through the sealing valve 40 back to the filter head 80. The open position of the sealing valve 40 is configured to allow the fluid to flow into and out of the internal volume 22 of the filter housing 20.

The filter housing 20 includes the internal volume 22 that contains a filter 24. The filter 24 filters the fluid f as it passes through the removable filter cartridge 10. The fluid f is filtered as it passes through the filter housing 40, such that the fluid f flowing back to the filter head 20 (and then out through the fluid outlet 4) is filtered fluid.

As shown in the illustrated embodiment, the filter housing 20 may have a bowl shape. The filter housing 20 has an open end 26 and a closed end 28. The open end 26 and the closed end 28 are opposite ends of the length L of the filter housing 20. The sealing valve 40 is coupled to the open end 26 of the filter housing 20. The open end 26 may also be referred to as a fluid inlet-outlet as the fluid f enters and exits the filter housing 20 through its open end 26.

The sealing valve 40 includes first threads 42A for removably coupling the removable filter cartridge 10 to the filter head 80. In particular, the first threads 42A are configured for removably coupling the sealing valve 40 of the removable filter cartridge 10 to the filter head 80. As shown in FIG. 4, the sealing valve 40 can include a coupling nut 44 with the first threads 42A. The first threads 42A configured to screw into threads 82 of the filter head 80 to removably couple the sealing valve 40 of the removable cartridge 10 to the filter head 80. For example, the sealing valve 40.

In an embodiment, the sealing valve 40 includes a circumferential groove 46 that extends around a circumference of the sealing valve 40. For example, the circumferential groove 46 can encircle the circumference of the valve body 48 of the sealing valve 40. The sealing valve 40 includes a snap ring 50 that is disposed in the circumferential groove 46. When the sealing valve 40 is coupled to the filter head 80 (e.g., screwed onto the filter head 80), the snap ring 50 is compressed between the sealing valve 40 and the filter head 80. As shown in the illustrated embodiment, when the coupling nut 44 of the sealing valve 40 is screwed onto the filter head 80, the coupling nut 44 pushes the snap ring 50 against the sealing valve 40. The snap ring 50 is compressed between the coupling nut 44 and the filter head 80 when coupling nut 44 is screwed onto the filter head 80.

The sealing valve 40 also includes second threads 42B that couple the sealing valve 40 to the filter housing 20. The second threads 42B screwing into threads 30 (e.g., third threads) of the filter housing 20. In an embodiment, the first threads 42A of the sealing valve 40 and the threads 30 of the filter housing 20 have the same structure (e.g., thread size, thread spacing, etc.). The second threads 42B of the sealing valve 40 screwed into the threads 30 of the filter housing 20 to couple together the filter housing 20 and the sealing valve 40. As shown in FIG. 4, the filter housing 20 can include a coupling nut 32 with the threads 30. For example, sealing valve 40 is coupled to filter housing 20 by screwing the coupling nut 32 of the filter housing 20 onto the sealing valve 40 (e.g., screwing the coupling nut 32 onto the second threads 42B).

The filter housing 20 includes a first inlet 34A, a second inlet 34B, and an outlet 36 provided at the open end 26 of the filter housing 20. For example, the first inlet 34A, the second inlet 34B, and the outlet 36 different passages extending into the filter housing 20 from the open end 26. The outlet 36 is disposed radially between the first inlet 34A and the second inlet 34B. Fluid is configured so that the fluid f enters the filter housing 20 through the first and second inlets 34A, 34B and exits the filter housing 20 (e.g., after being filtered) through the outlet 36.

The sealing valve 40 includes a handle 52 that is configured to be rotated to change the sealing valve 40 between its open position and its closed position. In an embodiment, the handle 52 can be rotated in a first direction (e.g., clockwise) to change the valve 40 to its closed position and is rotated in an opposite direction (e.g., counterclockwise) to change the sealing valve 40 to its closed position. A human operator (e.g., technician, etc.) can rotate the handle 52 to move the sealing valve 40 between its open and closed positions. In particular, the sealing valve 40 includes a valve core 54 disposed in the valve body 48 and the handle 52 is attached to the valve core 54. The valve core 54 is rotatable relative to the valve body 48, and the valve core 54 is configured to rotate along with the handle 52 to change the sealing valve 40 between its open and closed position.

The sealing valve 40 includes a first passage 56A, a second passage 56B, and a third passage 56C. The passages 56A, 56B, 56C are disposed in the rotatable valve core 52 of the sealing valve 40. Each of the passages 56A, 56B, 56C extends through the rotatable valve core 52. The sealing valve 40 is configured to such that when in its open position (e.g., as shown in FIG. 4), the first passage 56A aligns with the first inlet 34A of the filter housing 20, the second passage 56B aligns with the second inlet 34B of the filter housing 20, and the third passage 56C aligns with the outlet 36 of the filter housing 20. Each passage "aligns" with its corresponding inlet/outlet as the passage extends in a direction towards its respective inlet/outlet.

As shown by the dashed lines in FIG. 4, the first passage 56A and second passage 56B fluidly connects the fluid inlet 2 of the filter head 80 to the first and second inlets 34A, 34B of the filter housing 20, and the third passage 56C fluidly connects the outlet 36C of the filter housing 20 to the fluid outlet 4 of the filter head. For example, the first and second passages 56A, 56B direct the fluid f supplied from the passage of the fluid inlet 2 of the filter head 80 to the inlets 34A, 34B of the filter housing 20. For example, the third passage 56C directs the filtered fluid f from the outlet 36 to the passage in the filter head 80 for the fluid outlet 4.

It should be appreciated that the filter housing 20 in other embodiments may have a different number of inlets and outlets 56A, 56B at its open end 26 than three (e.g., one inlet, more than two inlets, multiple outlets etc.). In such embodiments, the sealing valve 40 may have a different number of passage 56A, 56B, 56C than three (e.g., same number of corresponding passages as inlets and outlets in the filter housing 20, two of the passages, etc.).

Figure 5:
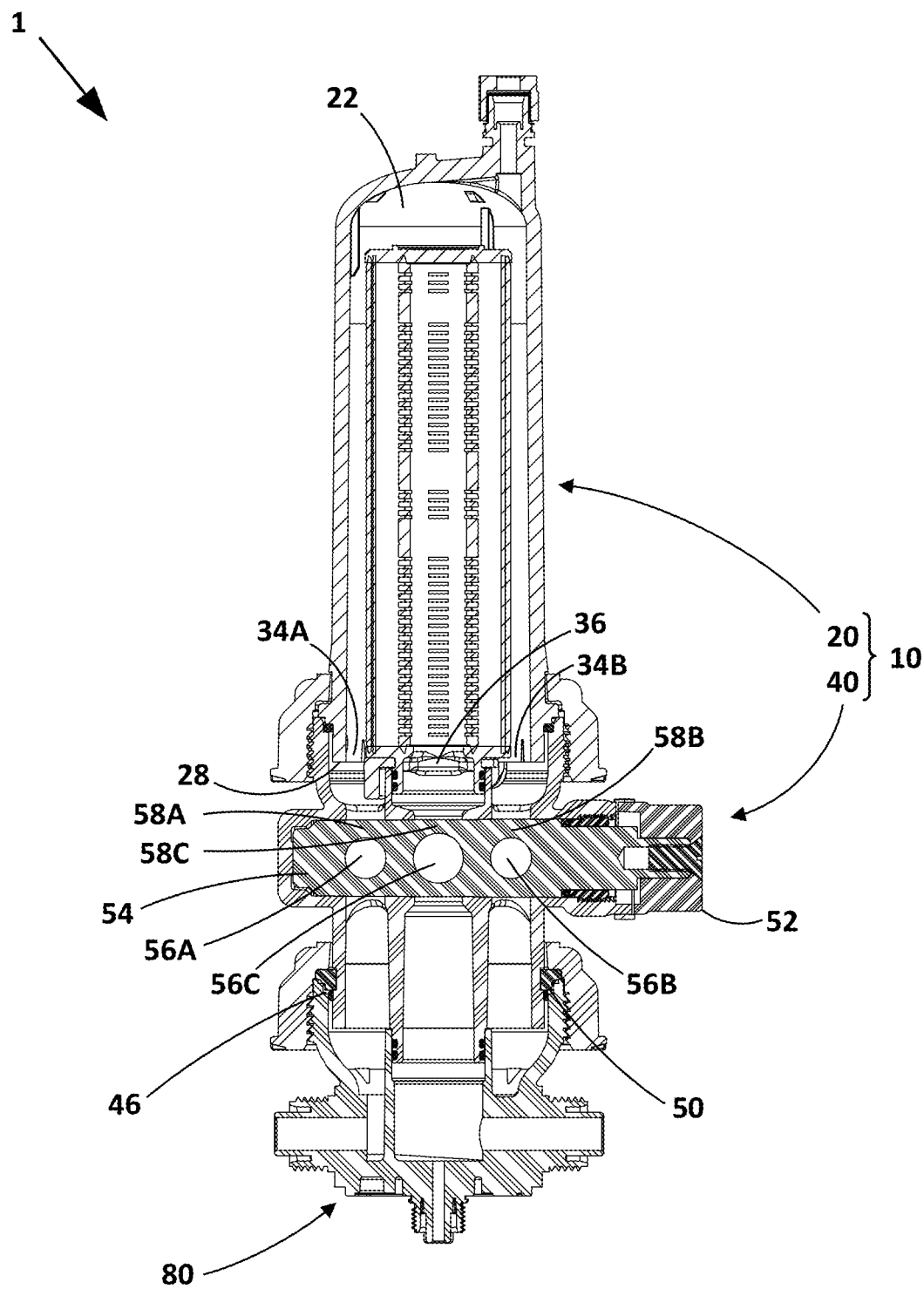
FIG. 5 is a cross sectional view of the filter assembly along the line IV-IV in FIG. 3 in a closed position, according to an embodiment.

FIG. 5 shows the filter assembly 1 when the seal valve 40 is in the closed position. The removable filter cartridge 10 is configured to have the seal valve 40 moved to the closed position while still removably coupled to the filter head 80. When the valve seal 40 is changed to its closed position (e.g., the handle 52 and valve core 54 are rotated to the closed position), the closed position seals the internal volume 22 of the filter housing 20. As shown in FIG. 5, the rotation of the valve seal 40 to its closed position blocks flow of fluid f through the valve seal 40. The closed valve seal 40 blocks flow of fluid into and out of the open end 26 of the filter housing 20. The closed valve seal 40 seals the open end 26 of the filter housing 20.

In the closed position, the rotation of the valve core 54 causes the passages 56A, 56B, 56C to no longer being aligned with their respective inlet/outlet 34A, 34B, 36 of the filter housing. The sidewalls 58A, 58B, 58C of the passages 56A, 56B, 56C block off each of the inlets/outlet(s) 34A, 34B, 36 in the open end 26 of the filter housing 20. The sidewall 58A of the first passage 56A and the sidewall 58B of the second passage 56B block the first and second inlet 34A, 34A, and the sidewall 58C of the third passage 58C blocks off the outlet 36. For example, the sidewall 58A of the first passage 34A blocks the first inlet 34A, and the sidewall 58B of the second passage 34B blocks the second inlet 34B.

When the removable filter cartridge 10 is removed from the filter head 80 (e.g., the coupled filter housing 20 and sealing valve 40 are uncoupled/unscrewed from the filter head 80), the sealing valve 40 is configured to maintain the sealing of the internal volume 22. The sealing valve 40 is configured to maintain the sealing of filter housing 20 while the cartridge remains uncoupled from a filter head. In particular, the closing of the sealing valve 40 seals the filter housing 20 such that any of the liquid in the internal volume 22 is trapped within the removable filter cartridge 10. This is advantageous over previous configuration in that the removable filter cartridge 10 can be removed more quickly without having to be drained of liquid.

In an embodiment, the removable filter cartridge 10 is reusable. The filter cartridge 10 can be regenerated by passing a different fluid through the filter cartridge 10 to restore the filtering capacity of the filter 24. In an embodiment, the different fluid may be a cleaning fluid (e.g., hydrofluoric acid, or the like). In some embodiment, the different fluid may be the same type/chemistry as the fluid the filter 24 is configured to filter. For example, if the filter is configured to filters solids from $HNO_3$ during use, the filter is configured to be regenerated/cleaned by passing clean $HNO_3$ through the filter 24. The different fluid can, for example, remove the solids retained in the filter 24 during the filtering of the fluid f. In some embodiments, a used filter cartridge 10 is transported off site to be regenerated/cleaned for reuse. The filter cartridge 10 than transported back to the filtering location/site once it has been regenerated/cleaned. The filter cartridge 10 remaining sealed during the transport to the off-site location.

For example, a used filter cartridge 10 is configured to be removably coupled to a cleaning head (not shown) (e.g., screwed onto the cleaning head). After being removably coupled to a cleaning head, the sealing valve 40 is opened and then: drained of the liquid trapped in the internal volume 22 through the cleaning head, and the cleaning head directs the different fluid through the filter cartridge 10 and its filter 24 to regenerate/clean the filter 24. The regenerate filter cartridge 10 is then decoupled from the cleaning head and is ready to be used again. For example, the regenerated filter cartridge 10 may be brought back and recoupled to the filter head 80 to provide filtering 40 of more fluid f.

Figure 6A:
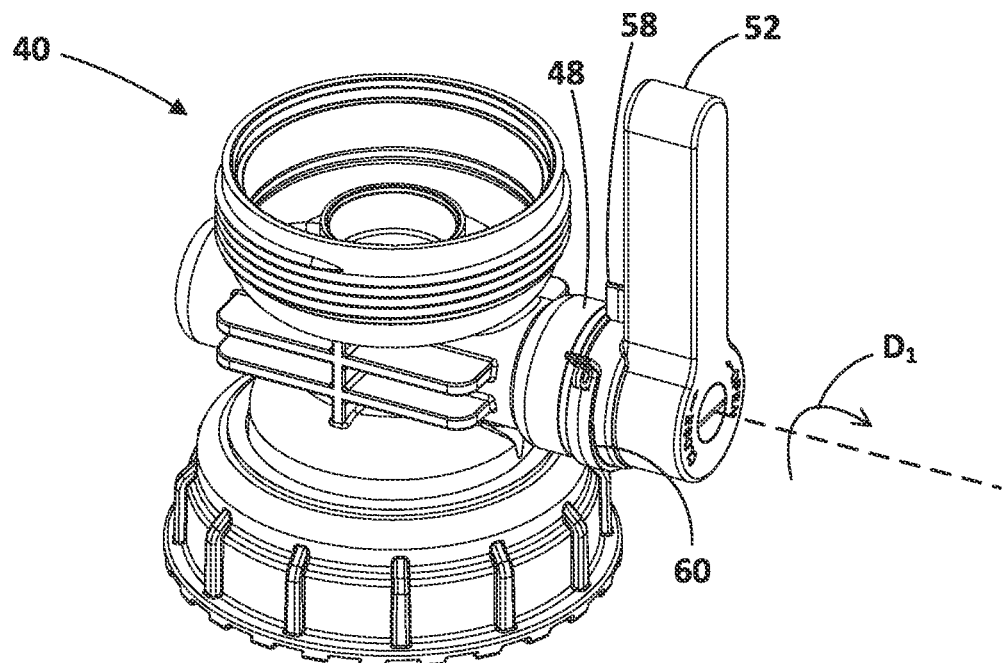
FIGS. 6A and 6B are a front perspective views of a sealing valve of the filter assembly in FIG. 4 with the sealing valve in the open position and closed position, respectively, according to an embodiment.
Figure 6B:
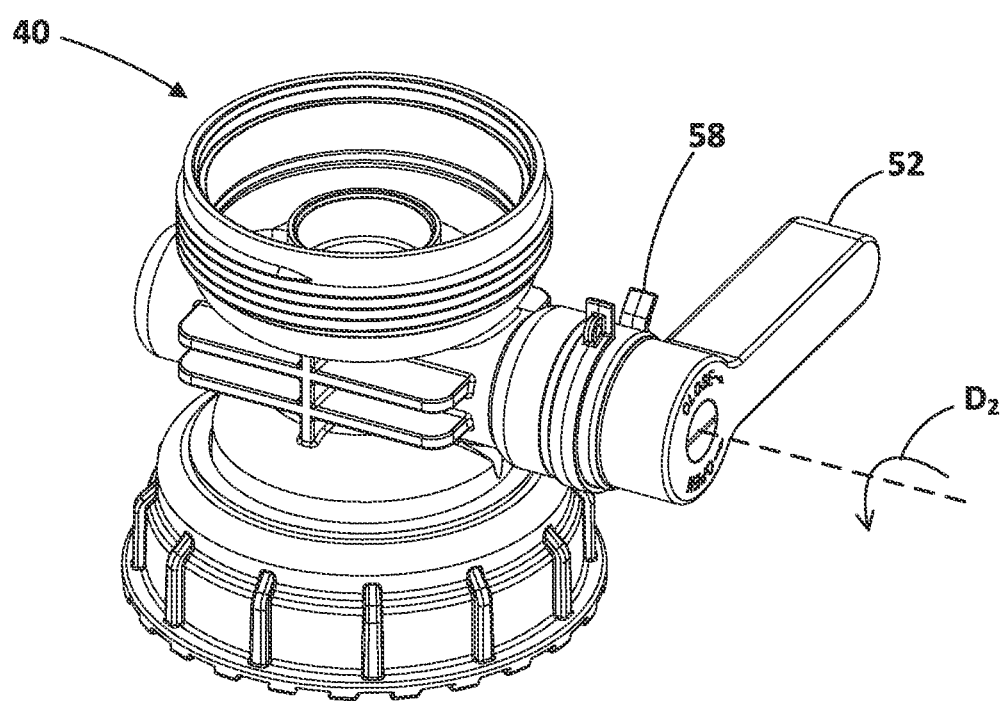

FIG. 6A shows the sealing valve 40 in the open position. FIG. 6B shows the sealing valve 40 in the closed position. The sealing valve 40 is changed from the open position (e.g. FIG. 6A) to the closed position (e.g., FIG. 6B) by rotating the handle 52 in a first direction D1 (e.g., clockwise). The sealing valve 40 is changed from the closed position to the open position by rotating the handle 52 in an opposite direction D2 (e.g., counter-clockwise). In the illustrated embodiment, the handle 52 is rotated 90 degrees to change the sealing valve 40 between the open and closed positions. In an embodiment, the handle 52 may be configured to be rotated at least 90 degrees to change the sealing valve 40 between the open and closed positions.

The sealing valve 40 can include a retainer clip 58 to prevent accidently changing from the closed position. The retainer clip 58 is configured to prevent rotation of the handle 52 from the closed position. When the sealing valve 40 is rotated into the closed position, the retaining clip 58 moves into a groove 60 in the sealing valve 40. Once disposed in the groove 60, the ends of the retaining clip 58 respectively abut the body 48 of the sealing valve 40 and the handle 52 preventing rotation of the handle. The retainer clip 58 prevents removing of the sealing valve 40 from the closed position until the retaining clip 58 is moved out of the groove 60. For example, the retaining clip 58 is moved out of the groove 60 by pushing on the retaining clip 58 to expand/open the retaining clip 58.

Figure 7:
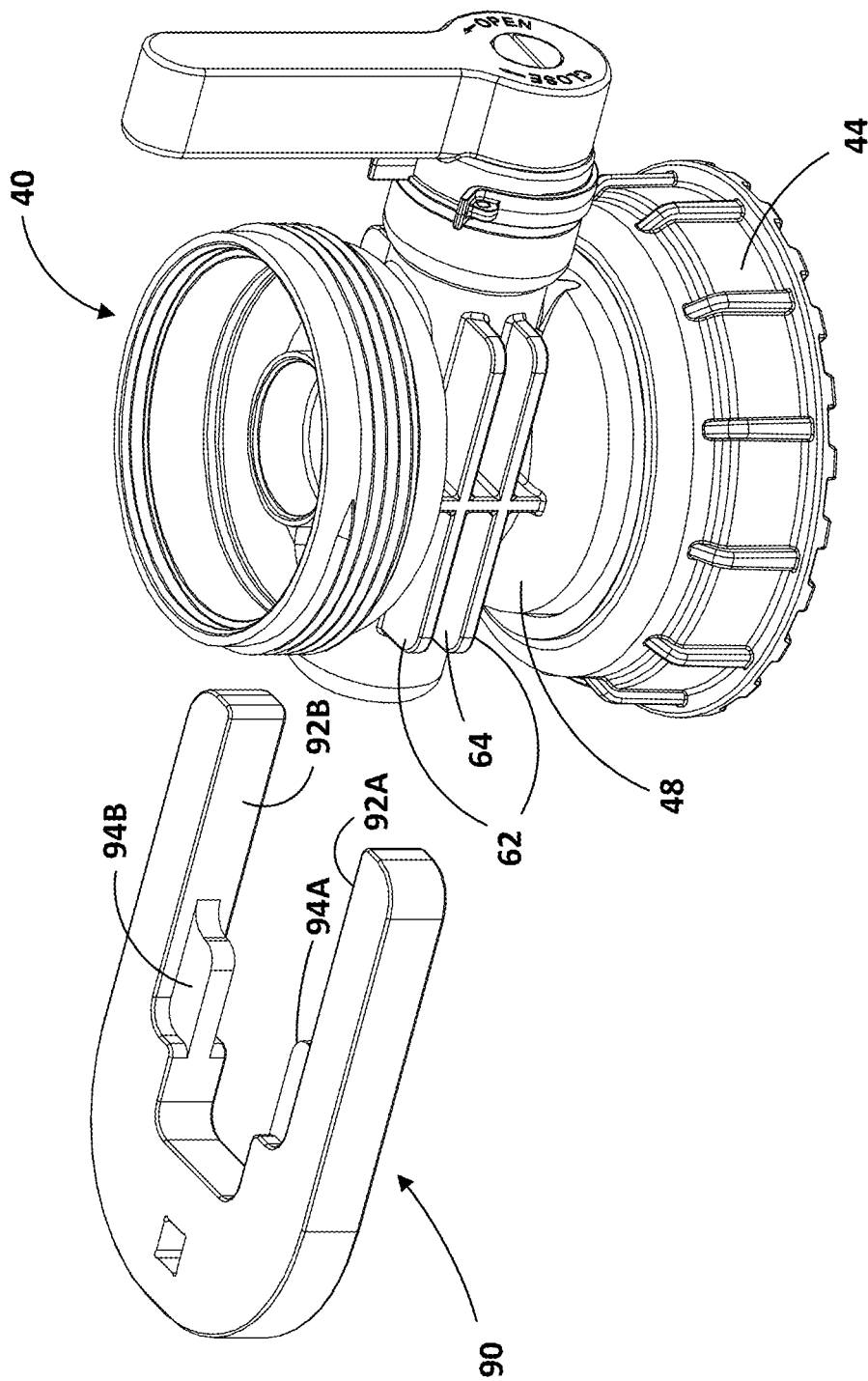
FIG. 7 is a front perspective view of the sealing valve of the filter assembly in FIG. 5, according to an embodiment.

FIG. 7 shows the sealing valve 40 with a wrench 90 for the sealing valve 40. The wrench 90 is used to hold and prevent rotation of the sealing valve 40 when the coupling nut 44 is screwed onto the filter head 80. The body 48 of the sealing valve 40 includes a two sets of horizontal ribs 62. The two sets of the horizontal ribs 62 respectively provided on opposite sides of the sealing valve 40 (e.g., one set of on the font side and a second set on the rear side of the valve body 48). A slot 64 is formed between each set of horizontal ribs 62.

The wrench 90 has an a first inner surface 92A and a second inner surface 92B that faces the first inner surface 92A. A rail 94A, 94B projects from and extends along each inner surface 92A, 92B, respectively. The wrench 90 configured to hold the sealing valve 40 by having each of its inner surfaces 92A, 92B respectively contacting the top of their respective pair of horizontal ribs 62 with its rail 94A, 94B disposed in the respective slot 64. For example, the first inner surface 92A contacts the tops of the horizontal ribs 62 on the front of the sealing valve 40 and the rail 94A fits into the slot 64 between said horizontal ribs 62.

The filter assembly 1 is shown with the filter cartridge 10 being coupled downwards onto the filter head 80. However, it should be appreciated that the removable filter cartridge 10 in other embodiments may couple to the filter head 80 in a different direction. For example, the filter cartridge 10 in other embodiments may couple in a horizontal direction or upwards to the filter head 80.

Figure 8:
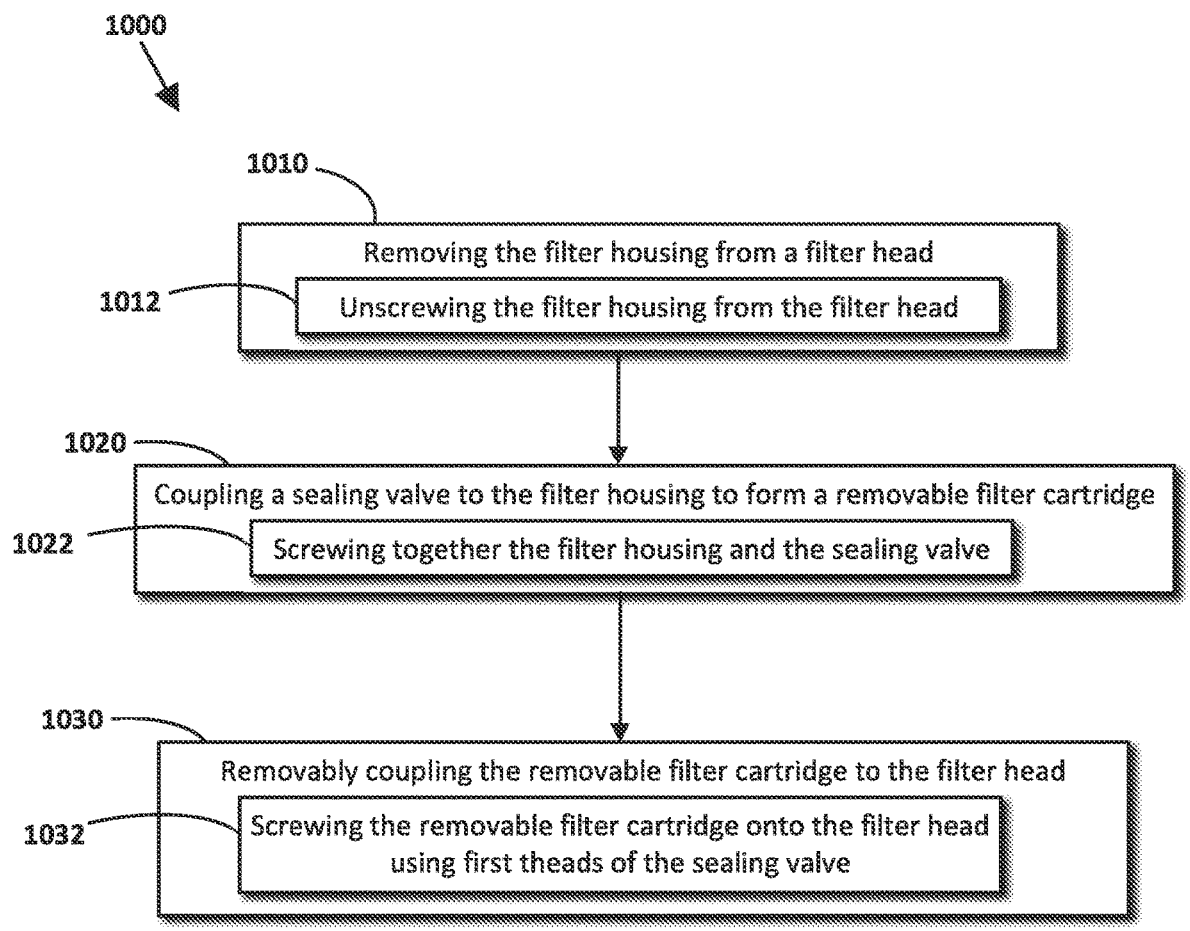
FIG. 8 is a block flow diagram of a method of retrofitting a filter housing

FIG. 8 shows a block flow diagram of a method 1000 of retrofitting a filter housing (e.g., filter housing 20 in FIG. 2). The filter housing has an internal volume (e.g., internal volume 22) containing a filter (e.g., filter 24). For example, the method 1000 may be for retrofitting a filter housing (e.g., filter housing 20) was originally intended to directly removably coupled to a filter head (e.g., filter header 80). The method starts at 1010.

At 1010, the filter housing is removed from a filter head. Removing the filter housing from the filter head 1010 includes unscrewing the filter housing from the filter head 1012. In an embodiment, unscrewing the filter housing from the filter head 1012 can include unscrewing a coupling nut of the filter housing (e.g., coupling nut 44) from the filter head. The method 1000 then proceeds to 1020.

At 1020, a sealing valve (e.g., sealing valve 40) is coupled to the removable filter to form a removable filter cartridge (e.g., removable filter cartridge 10). Coupling the sealing valve to the removable filter 1020 includes screwing together the filter housing and the sealing valve 1022. In an embodiment, screwing together the filter housing and the sealing valve 1022 can include screwing the coupling nut of the filter housing onto the sealing valve. The method 1000 then proceeds to 1030.

At 1030, the removable filter cartridge is removably coupled to the filter head. Removable coupling the cartridge to the filter head 1030 includes screwing the removable filter cartridge onto the filter head using first threads of the sealing valve (e.g., first threads 42A) 1032. In an embodiment, screwing the removable filter cartridge onto the filter threads 1032 includes screwing a coupling nut of the sealing valve (e.g., coupling nut 44) onto the filter head.

It should be appreciated that the method 1000 in an embodiment may be modified to include features as described above with respect to the filter assembly 1 in FIGS. 1-5, the sealing valve 40 in FIGS. 6A and 6B, and/or the wrench 90 and sealing valve 40 in FIG. 7.

Aspects

Any of Aspects 1-11 can be combined with any of aspects 12-19, and any of Aspects 12-16 can be combined with any of Aspects 17-19.

Aspect 1. A removable filter cartridge, comprising: a filter housing with an internal volume containing a filter; and a sealing valve coupled to an open end of the filter housing, the sealing valve including first threads for removably coupling the removable filter cartridge to a filter head, the sealing valve having: an open position that allows fluid flow into and out of the internal volume of the filter housing, and a closed position that seals the internal volume of the filter housing, the sealing valve in the closed position configured to seal the internal volume while removably coupled to the filter head and maintain the seal while the removable filter cartridge remains uncoupled.

Aspect 2. The removable filter cartridge of Aspect 1, wherein the sealing valve includes second threads threaded into third threads of the filter housing to couple the filter housing and the sealing valve.

Aspect 3. The removable filter cartridge of Aspect 2, wherein the filter housing includes a coupling nut with the third threads, the coupling nut being screwed onto the sealing valve to couple the sealing valve to the filter housing.

Aspect 4. The removable filter cartridge of any one of Aspects 2 and 3, wherein the first threads of the sealing valve and the third threads of the filter housing have the same thread structure.

Aspect 5. The removable filter cartridge of any one of Aspects 1-4, wherein the open position of the sealing valve is configured to allow the removable filter cartridge when removably coupled to the filter head to: receive the fluid from the filter head, pass the fluid through the filter for filtering, and then direct the fluid back to the filter head.

Aspect 6. The removable filter cartridge any one of Aspects 1-5, wherein the sealing valve includes a coupling nut with the first threads, the coupling nut configured be to screwed onto the filter head to removably couple the sealing valve to the filter head.

Aspect 7. The removable filter cartridge of Aspect 6, wherein the sealing valve includes: a circumferential groove, and a snap ring disposed in the circumferential groove, the snap ring configured to be compressed against the filter head by the coupling nut when the coupling nut is screwed onto the filter head.

Aspect 8. The removable filter cartridge of any one of Aspects 1-7, wherein the filter housing includes a first inlet, a second inlet, and an outlet, and the sealing valve includes a first passage, a second passage, and a third passage, wherein in the open position: the first passage aligns with the first inlet, the second passage aligns with the second inlet, and the third passage aligns with the outlet, and in the closed position: a sidewall of the first passage block the first inlet, a sidewall of the second passage blocks the second inlet, and a sidewall of the third passage blocks the outlet.

Aspect 9. The removable filter cartridge of any one of Aspects 1-8, wherein the sealing valve includes a handle that is rotatable to change the sealing valve between the open position and the closed position.

Aspect 10. The removable filter cartridge of any one of Aspects 1-9, wherein changing the sealing valve from the open position to the close position is configured to seal the filter housing such that any liquid within the internal volume is trapped within the removable filter cartridge.

Aspect 11. The removable filter cartridge of any one of Aspects 1-10, where the filter is configured to be regenerated by passing a second fluid through the removable filter cartridge.

Aspect 12. A sealing valve for a removable filter cartridge, the sealing valve comprising: first threads for removably coupling the sealing valve to a filter head; and second threads for coupling the sealing valve to a filter housing to form the removable filter cartridge, the filter housing having an internal volume containing a filter, wherein the sealing valve has: an open position configured to direct fluid from the filter head into the filter housing and then from the filter housing back to the filter head, and a closed position configured to seal the internal volume of the filter housing when the removable filter cartridge is removably coupled to the filter head and to maintain the seal while the removable filter cartridge remains uncoupled.

Aspect 13. The sealing valve of Aspect 12, further comprising: a coupling nut with the first threads, the coupling nut configured to be screwed onto the valve head to removably couple the sealing valve to the filter head.

Aspect 14. The sealing valve of Aspect 13, wherein the sealing valve includes: a circumferential groove, and a snap ring disposed in a circumferential groove, the snap ring configured to be compressed against the filter head by the coupling nut when the coupling nut is screwed onto the filter head.

Aspect 15. The sealing valve of any one of Aspects 12-14, wherein the sealing valve includes a first passage, a second passage, and a third passage, and in the open position: the first passage and second passage are configured to align with a first inlet and a second inlet of the removable filter, and the third passage is configured to align with an outlet of the removable filter, and in the closed position: a sidewall of the first passage and a sidewall of the second passage are configured to block the first inlet and the second inlet of the removable filter, and a sidewall of the third passage is configured to block the outlet.

Aspect 16. The sealing valve of any one of Aspects 12-15, wherein the sealing valve includes a handle that is rotatable to change the sealing valve between the open position and the closed position.

Aspect 17. A method of retrofitting a filter housing, the filter housing having an internal volume containing a filter, the method comprising: removing the filter housing from a filter head, which includes unscrewing the filter housing from the filter head; coupling a sealing valve to the removable filter to form a removable filter cartridge, which includes screwing together the filter housing and the sealing valve; coupling the removable filter cartridge to the filter head, which includes screwing the removable filter cartridge onto the filter head using first threads of the sealing valve, wherein the sealing valve has: an open position that allows fluid from the filter head to flow into and out of the filter housing through the sealing valve, and a closed position that seals the internal volume of the filter housing, the sealing valve in the closed position configured seal the internal volume while removably coupled to the filter head and maintain the seal while the removable filter cartridge remains uncoupled.

Aspect 18. The method of Aspect 17, wherein the screwing together the filter housing and the sealing valve includes screwing a first coupling nut of the filter housing onto the sealing valve, and the screwing the removable filter cartridge onto the filter head includes screwing a second coupling nut of the sealing valve onto the filter head.

Aspect 19. The method of any one of Aspects 17 and 18, wherein the sealing valve includes a handle that is rotatable to change the sealing valve between the open position and the closed position.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A removable filter cartridge, comprising:
    a filter housing with an internal volume containing a filter, a first inlet, a second inlet, and an outlet; and
    a sealing valve coupled to an open end of the filter housing, the sealing valve including:
        first threads around a circumference of the sealing valve for removably coupling the removable filter cartridge to a filter head;
        second threads threadable into third threads of the filter housing to couple the filter housing and the sealing valve;
        a first passage, a second passage, and a third passage;
        a first coupling nut with the first threads, the first coupling nut configured to be screwed onto the filter head while the sealing valve is not rotated to removably couple the sealing valve to the filter head;
        a circumferential groove; and
        a snap ring disposed in the circumferential groove, the snap ring configured to be compressed between the filter head and the first coupling nut when the first coupling nut is screwed onto the filter head;
    wherein the filter housing includes a second coupling nut with the third threads, the second coupling nut being screwable onto the sealing valve to couple the sealing valve to the filter housing while the filter housing is not rotated;
    the sealing valve having:
        (i) an open position wherein the first passage aligns with the first inlet, the second passage aligns with the second inlet, and the third passage aligns with the outlet; and
        (ii) a closed position wherein a sidewall of the first passage blocks the first inlet, a sidewall of the second passage blocks the second inlet, and a sidewall of the third passage blocks the outlet.

2. The removable filter cartridge of claim 1, wherein the first threads of the sealing valve and the third threads of the filter housing have the same thread structure.

3. The removable filter cartridge of claim 1, wherein the open position of the sealing valve is configured to allow the removable filter cartridge when removably coupled to the filter head to: receive the fluid from the filter head, pass the fluid through the filter for filtering, and then direct the fluid back to the filter head.

4. The removable filter cartridge of claim 1, wherein the sealing valve includes a handle that is rotatable to change the sealing valve between the open position and the closed position.

5. The removable filter cartridge of claim 1, wherein changing the sealing valve from the open position to the closed position is configured to seal the filter housing such that any liquid within the internal volume is trapped within the removable filter cartridge.

6. The removable filter cartridge of claim 1, where the filter is configured to be regenerated by passing a second fluid through the removable filter cartridge.

7. The removable filter cartridge of claim 1, wherein:
    (i) when the sealing valve is in the open position, the sealing valve allows fluid flow into and out of the internal volume of the filter housing; and
    (ii) when the sealing valve is in the closed position, the sealing valve seals the internal volume of the filter housing.

8. A sealing valve for a removable filter cartridge, the sealing valve comprising:
    a first passage, a second passage, a third passage;
    first threads around a circumference of the sealing valve for removably coupling the sealing valve to a filter head;
    second threads threadable into third threads of a filter housing to couple the filter housing and the sealing valve;
    a first coupling nut with the first threads, the first coupling nut configured to be screwed onto the filter head while the sealing valve is not rotated to removably couple the sealing valve to the filter head;
a circumferential groove; and
a snap ring disposed in the circumferential groove, the snap ring configured to be compressed between the filter head and the first coupling nut when the first coupling nut is screwed onto the filter head,
wherein the sealing valve is capable of being coupled to the filter housing to form the removable filter cartridge;
the filter housing including a second coupling nut having the third threads and the second coupling nut being screwable onto the sealing valve to couple the sealing valve to the filter housing while the filter housing is not rotated; and
the sealing valve, when coupled to the filter housing, has:
(i) an open position wherein the first passage and second passage are configured to align with a first inlet and a second inlet of the filter housing, and the third passage is configured to align with an outlet of the filter housing; and
(ii) a closed position wherein a sidewall of the first passage and a sidewall of the second passage are configured to block the first inlet and the second inlet of the filter housing, and a sidewall of the third passage is configured to block the outlet of the filter housing.

9. The sealing valve of claim 8, wherein the sealing valve includes a handle that is rotatable to change the sealing valve between the open position and the closed position.

10. The sealing valve of claim 8, wherein:
(i) when the sealing valve is in the open position, the sealing valve directs fluid from the filter head into the filter housing and then from the filter housing back to the filter head; and
(ii) when the sealing valve is in the closed position, the sealing valve is configured to seal the internal volume of the filter housing when the removable filter cartridge is removably coupled to the filter head and to maintain the seal while the removable filter cartridge remains uncoupled.

11. A removable filter cartridge comprising:
a filter housing with an internal volume containing a filter; and
a sealing valve coupled to an open end of the filter housing, the sealing valve including:
first threads around a circumference of the sealing valve for removably coupling the removable filter cartridge to a filter head;
second threads threadable into third threads of the filter housing to couple the filter housing and the sealing valve;
wherein the filter housing includes a coupling nut with the third threads, the coupling nut being screwable onto the sealing valve to couple the sealing valve to the filter housing while the filter housing is not rotated;
the sealing valve having:
(i) an open position that allows fluid flow into and out of the internal volume of the filter housing, and
(ii) a closed position that seals the internal volume of the filter housing, the sealing valve in the closed position configured to seal the internal volume while removably coupled to the filter head and maintain the seal while the removable filter cartridge remains uncoupled.

12. The removable filter cartridge of claim 11, wherein the open position of the sealing valve is configured to allow the removable filter cartridge when removably coupled to the filter head to: receive the fluid from the filter head, pass the fluid through the filter for filtering, and then direct the fluid back to the filter head.

13. The filter cartridge of claim 11 comprising a first coupling nut with the first threads, the first coupling nut configured to be screwed onto the filter head to removably couple the sealing valve to the filter head.

14. A sealing valve for a removable filter cartridge, the sealing valve comprising:
first threads around a circumference of the sealing valve for removably coupling the sealing valve to a filter head;
second threads threadable into third threads of a filter housing to couple the filter housing and the sealing valve;
the filter housing including a coupling nut having the third threads and the coupling nut being screwable onto the sealing valve to couple the sealing valve to the filter housing while the filter housing is not rotated;
wherein when the sealing valve is coupled to the filter housing, the sealing valve has:
an open position configured to direct fluid from the filter head into the filter housing and then from the filter housing back to the filter head, and
a closed position configured to seal the internal volume of the filter housing when the removable filter cartridge is removably coupled to the filter head and to maintain the seal while the removable filter cartridge remains uncoupled.

15. The sealing valve of claim 14 comprising a first coupling nut with the first threads, the first coupling nut configured to be screwed onto the filter head to removably couple the sealing valve to the filter head.

* * * * *